United States Patent [19]

Finelli

[11] 3,897,400

[45] July 29, 1975

[54] POLYURETHANE CURED WITH AN AROMATIC MONOSULFIDE DIAMINE

[75] Inventor: Anthony F. Finelli, Akron, Ohio

[73] Assignee: The Goodyear Tire & Rubber Company, Akron, Ohio

[22] Filed: Dec. 26, 1973

[21] Appl. No.: 427,773

[52] U.S. Cl............... 260/77.5 Am; 260/75 NM; 260/77.5 CR; 260/47 CB
[51] Int. Cl.² .......................................... C08G 18/38
[58] Field of Search ............ 260/77.5 Am, 75 NM, 260/77.5 CR, 47 CB, 830 P

[56] References Cited
UNITED STATES PATENTS

| | | | |
|---|---|---|---|
| 2,765,341 | 10/1956 | Wirth et al. | 260/77.5 AM |
| 3,036,996 | 5/1962 | Kogon | 260/77.5 AM |
| 3,794,618 | 2/1974 | Rating et al. | 260/77.5 AM |

OTHER PUBLICATIONS

Fedotova et al., Chem. Abstracts, Vol. 68, 1968, p. 1139, Item 12113f.

*Primary Examiner*—M. J. Welsh
*Attorney, Agent, or Firm*—F. W. Brunner; H. C. Young, Jr.

[57] ABSTRACT

A cured polyurethane prepared by reacting 4,4'-diaminodiphenylsulfide with a mixture of organic polyisocyanate and polymeric polyol containing an excess of said polyisocyanate or with a prepolymer of said polyisocyanate and polymeric polyol.

10 Claims, No Drawings

POLYURETHANE CURED WITH AN AROMATIC MONOSULFIDE DIAMINE

This invention relates to polyurethanes. More particularly, it relates to isocyanate-terminated polyol prepolymers which have been extended or cross-linked with an aromatic monosulfide diamine curative.

Diamines are often used to play a unique part in shaping the characteristics and structure of polyurethanes. The ultimate physical properties and appearance of polyurethanes are highly dependent upon the unpredictable manner in which the diamines extend, cross-link or cure basic polyurethane prepolymers.

For example, aromatic diamines can be used, such as the well-known 4,4'-methylene bis(2-chloroaniline), sometimes known as MOCA, and the well-known 4,4'-methylenedianiline, sometimes known as MDA. However, for typical commercial applications, the MDA reacts too fast and the MOCA requires a catalyst in order to provide a fast enough reaction time to be commercially feasible.

Furthermore, cured polyurethanes are many times deficient in physical properties over a broad temperature range, particularly at low temperatures. Typically, a manipulation of polymeric polyether and polyester polyols is made in order to achieve good low temperature properties while maintaining higher temperature effectiveness.

In accordance with this invention, it has been discovered that simple substitution of a single sulfide radical for the bridging methylene radical of the 4,4'-methylenedianiline (MDA) yields an aromatic monosulfide diamine extender or curative for isocyanate-terminated polyol polyurethane prepolymers which does not need a catalyst at room temperature (about 25°C.) to provide a reaction rate suitable for most commercial applications, yet is substantially slower than MDA. It has furthermore been discovered that such an aromatic monosulfide diamine can enhance low temperature properties of various polyurethanes.

Therefore, in accordance with this invention, a cured polyurethane has been discovered which is prepared by the method which comprises reacting 4,4'-diaminodiphenylsulfide with at least about 80 percent or all of excess isocyanato groups in a composition or mixture derived by the method which comprises mixing an excess of a polyisocyanate having an isocyanate functionality of 2 to 3 with a polymeric polyol having a hydroxyl functionality of 2 to 3 and a molecular weight in the range of about 500 to about 6000, and preferably in the range of about 800 to about 5000.

More specifically, the invention is preferably a cured polyurethane prepared by reacting the 4,4'-diaminodiphenylsulfide with an isocyanate-terminated prepolymer prepared by the method which comprises reacting a polyisocyanate having an isocyanate functionality of 2 to 3 with the polymeric polyol having a hydroxyl functionality in the range of about 2 to about 3 where the ratio of the isocyanato groups to the hydroxyl groups of the polyol is in the range of about 1.3/1 to about 5/1, preferably about 1.5/1 to about 3/1, and where the ratio of the amino groups of said monosulfide diamine to excess isocyanato groups over said hydroxyl groups is in the range of about 0.5/1 to about 1.1/1, and preferably about 0.8/1 to about 1/1.

It is to be understood that the method of preparing the cured polyurethane of this invention can be modified by the addition of said polymeric polyols of up to about 1 to about 3 molar equivalents of monomeric hydrocarbon polyols having 2 to 3 hydroxyl groups and containing 2 to about 15 carbon atoms. In this case, the ratio of the isocyanato groups of the polyisocyanate is to the combined hydroxyl groups of the polymeric and monomeric polyols. Representative of such monomeric polyols are ethylene glycol, 1,3-propane diol, 1,4-butane diol, 1,5-pentane diol, 1,6-hexane diol and decamethylene glycol.

The polyurethane reaction mixtures used in this invention are typically liquid mixtures with the addition of a solvent commonly used to prepare polyurethanes, and particularly flexible polyurethanes, by the well-known 1-shot, prepolymer or quasi-prepolymer techniques. The quasi-prepolymer method differs from the prepolymer method in that only a portion of the polyol is initially reacted with the polyisocyanate with the remainder then added and reacted to form the prepolymer. The prepolymer is then cured or extended with the sulfide diamine.

The sulfide curative, polyols and polyisocyanates are typically reacted at temperatures in the range of about 20°C to about 150°C and preferably in the range of about 20°C to about 100°C.

A solvent can be used with the reaction mixture to facilitate its use in the form of a fluid mixture or solution, although it is generally preferred to use the reaction mixture with only a minor amount of solvent if any. If a solvent is used, it can be added to form a mixture containing up to about 60 weight percent solvent based on the total mixture. A preferable mixture can contain from about 40 to about 95 weight percent solids. However a higher or lower concentration of solids might be used. When the solids concentration is low, the individual applications will tend to deposit a thin layer of polyurethane polymer and a large amount of the solvent will have to be removed during the curing process. A solids concentration of 45 weight percent or higher is generally desired if a solvent is used.

Other methods generally known for the preparation of polyurethane reaction mixtures with or without the aid of solvents may also be used.

The sulfide diamine curative of this invention has a unique curative reactivity which allows improved processing for many commercial applications. Its curative reactivity is indeed unique since it falls between the slow rate of 4,4'-methylene bis(2-chloroaniline), otherwise known as MOCA, which normally needs a catalyst and the generally excessively fast reacting 4,4'-methylene dianiline, otherwise known as MDA. Thus, the unique sulfide diamine curative for the polyurethanes of this invention, which differ from MOCA and MDA primarily by the mono-sulfide substitution, can surprisingly now be used to prepare the cured polyurethanes without the need of reaction rate modifiers which might have been necessary with the other well-known practical curative. MOCA particularly needs a catalyst to speed up the reaction rate, whereas MDA normally either needs something to slow its reaction rate or must be used in fast application automated types of applications.

However, in unique situations, if desired, a catalyst can be used with the sulfide diamine curative of this invention such as the well-known tertiary amines, the tin salts of fatty acids and accelerators such as mercaptobenzothiazole.

In the practice of this invention, the reactive hydrogen containing polymeric material used in the preparation of the polyurethanes themselves typically comprises at least one member selected from the group consisting of polyester polyols, polyether polyols, and hydroxyl-terminated unsaturated polymeric polyols. The hydroxyl-terminated unsaturated polymeric polyols typically have a molecular weight of from about 2000 to about 4000 and a hydroxyl functionality of from about 2 to about 3. The reactive hydrogen-containing material generally used, other than the hydroxyl-terminated unsaturated polymeric polyol, has a molecular weight in the range of from about 700 to about 5000, and usually from about 1000 to about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Further examples of polyesters are caprolactone polyesters. The caprolactone polyesters are substantially linear, hydroxyl-terminated polymers prepared by reacting a caprolactone having 6 to 8 carbon atoms, preferably 6 carbon atoms, with a glycol having 4 to 7 carbon atoms and preferably 4 to 6 carbon atoms. Various suitable caprolactones include $\epsilon$-caprolactone, zeta-caprolactone and etacaprolactone. Alkyl substituted caprolactones can be used with alkyl substituents containing 1 to 2 carbon atoms selected from methyl and ethyl radicals such as methyl $\epsilon$-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene etherthioether glycols or triols and alkyd resins. Generally the polytetramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxyl-terminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl-containing polymeric polyols are polybutadiene polyols, polyisoprene polyols, butadiene-styrene copolymer polyols having about 70 to 90 percent units derived from butadiene and about 30 to 10 percent units derived from styrene and also butadiene-acrylonitrile copolymer polyols.

The organic polyisocyanates used in this invention having 2 to 3 isocyanato groups particularly include various organic diisocyanates and mixtures thereof as well as polyisocyanates having 2.3 to 2.7 isocyanato groups. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), 3,3'-dimethyl-4,4'-diphenylmethane diisocyanate and 1,5-tetrahydronaphthalene diisocyanate and mixtures of such diisocyanates. For the purposes of the present invention, the toluene diisocyanates, diphenylmethane-4,4'-diisocyanate, 3,3'-dimethyl-4,4'-bis-phenylene diisocyanate, 4,4'-methylenebis(cyclohexylisocyanate) and 3,3'-dimethyl-4,4'-diphenylmethane diisocyanate are preferred. For convenience, these diisocyanates are referred to as TDI, MDI, TODI, $H_{12}$MDI and DMMDI, respectively.

Various non-reactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene and the liquid lower ketones such as acetone, methyl ethyl ketone, methyl isobutyl ketone and diisobutyl ketone. If the polyurethane reaction mixtures are to be used to prepare the cured polyurethanes in confined areas which are subject to explosive hazards, nonflammable polyurethane solvents can be used to form nonflammable polyurethane reaction mixtures. Mixtures of solvents may also be used to obtain satisfactory spreading properties and evaporation rates when the polyurethane spray composition is applied to a polymeric surface.

To enhance the cured polyurethane's hydrolysis resistance, about 1 to about 15, preferably about 2 to about 5, weight percent of an epoxy resin and at least sufficient to give an excess of epoxide groups relative to the total excess of amino groups of the diamine curative over the said isocyanato groups might be used.

Thus, an excess of epoxide groups is required over the amino groups of the curative, such as at least about 5 to about 50 equivalent percent excess, based on two epoxy groups per amino (—NH₂) group, to provide a polyurethane composition containing sufficient free epoxide groups.

Hydrolysis resistance is typically determined by immersion in distilled water at 158°F. A substantial retention of tensile strength and elongation after 12 days immersion can be related to a substantial resistance to hydrolysis. The tensile and elongation are normally determined at about 25°C by methods typically used by those skilled in the art.

Preferred resins for this invention are derived from epichlorhydrin and 2,2-bis(4-hydroxypehnyl) propane with an epoxy equivalency of about 150 to about 220, preferably about 175 to about 210. Resins which are pourable liquids at about 25°C are preferred but others can be used in solution. Typical resins are those obtainable under the tradenames Epon 828 and Epon 1001 from the Shell Chemical Company.

The practice of this invention is further illustrated by reference to the following examples which are intended to be representative rather than restrictive of the scope of the invention. Unless otherwise indicated, all parts and percentages are by weight.

EXAMPLE I

To a reactor was charged and reacted 1 mole of an 80 ethylene/20 propylene adipate having a molecular weight of 1800 and 2 moles of a 80/20 2,4 2,6-toluene diisocyanate to form a prepolymer. One hundred parts of the mixture was diluted with 65 parts of a mixture of 30 parts toluene, 30 parts methyl ethyl ketone and 5 parts of a mixture of 10 percent celluose acetate butyrate in methyl ethyl ketone. The diluted prepolymer was analyzed to have an isocyanate content of 2 percent.

An extender solution was then prepared by dissolving 2 parts 4,4'-diaminodiphenylsulfide in 10 parts methyl ethyl ketone. This 12 parts extender solution was mixed with 50 parts of the prepared diluted prepolymer. A film of the mixture was drawn on the surface of a polyethylene slab and allowed to cure at about 25°C for about 16 hours. The mixture itself had a pot life of about 5 to about 7 minutes. A portion of the film was analyzed and indicated to have the following physical properties determined by methods normally used by those having skill in the rubber and elastomer art shown in Table 1.

Table 1

| | |
|---|---|
| Ultimate tensile (psi) | 4900 |
| Ultimate Elongation (%) | 560 |
| Sample thickness (inches) | 0.012 |
| Modulus (psi) 100% | 700 |
| 300% | 1200 |
| 500% | 3500 |
| Volume change in Larmol (1) | |
| 4 days at 25°C | 13.5% |
| Smear point (°F) | 379°F |
| Hydrolysis resistance (3 days immersion in water) | |
| | Tensile/Elongation |
| 158°F | 4200/670 |
| 180°F | 3300/720 |

(1) (70/30 isooctane/toluene)

EXAMPLE II

To a reactor was charged and reacted 100 parts of an 80 ethylene/20 propylene adipate having a molecular weight of about 1800, 200 parts tetramethylene adipate having a molecular weight of about 2200 and 55 parts of an 80/20 2,4/2,6-toluene diisocyanate to provide an NCO/OH ratio of 2. One hundred parts of the resulting prepolymer was diluted with 65 parts of a solvent mixture of 30 parts toluene, 30 parts methyl ethyl ketone and 5 parts of a 10 percent cellulose acetate butyrate in methyl ethyl ketone. The diluted prepolymer was analyzed to have an isocyanate content of 2.1 percent.

An extender solution was then prepared by dissolving 2.2 parts 4,4'-diamino diphenyl sulfide in 6 parts methyl ethyl ketone. The resulting 8.2 parts extender solution was added to 50 parts of prepared diluted prepolymer. A film of the resulting mixture was drawn on a polyethylene slab and allowed to cure at about 25°C for about 16 hours. The mixture itself had a pot life of about 3 to 4 minutes. A portion of the elastomer was analyzed and shown to have the following physical properties as illustrated in Table 2.

Table 2

| | |
|---|---|
| Ultimate tensile (psi) | 4800 |
| Ultimate elongation (%) | 650 |
| Sample thickness (inches) | .020 |
| Modulus (psi) 100% | 700 |
| 300% | 1200 |
| 500% | 2500 |
| Crescent tear (lbs/in) | 415 |
| Hydrolysis resistance | |
| (3 days immersion in water at 180°F) | |
| | Tensile/Elongation |
| 180°F/3 days | 2300/780 |
| Volume change in Larmol | |
| 4 days at about 25°C | 15.1% |

EXAMPLE III

To a reactor was charged 100 parts tetramethylene adipate having a molecular weight of about 1000, 100 parts tetramethylene adipate having a molecular weight of about 2000 and 78 parts of 4,4'-dicyclohexyl methane diisocyanate (H₁₂MDI) to form a prepolymer having an NCO/OH ratio of 2.

The prepolymer was diluted in toluene and analyzed to have an isocyanate content of 2.2 percent.

A film was drawn, the following recipe shown in Table 3, and allowed to cure at about 25°C for about 16 hours.

Table 3

| Compound | Parts |
|---|---|
| Diluted prepolymer | 50 |
| 4,4'-diaminophenyl sulfide | .7 |
| 2-mercaptobenzothiazole (MBT) | 0.5 |
| methyl ethyl ketone | 8.0 |

The resulting elastomer was determined to have the following properties shown in Table 4.

Table 4

| | |
|---|---|
| Tensile (psi) | 4700 |
| Elongation (%) | 330 |
| Thickness (inches) | 0.011 |
| Modulus (psi) 100% | 1100 |
| 300% | 3600 |
| Steam degradation (5 hrs at 240°F in steam autoclave) | |
| Tensile (psi) | 7300 |
| Elongation (%) | 400 |
| Masland cold freeze test | OK at −40°F |
| Hydrolysis resistance (3 days immersion in water at 180°F) | |
| Tensile | 5800 |
| Elongation | 400 |
| Volume change in Larmol | |

Table 4-Continued

| | |
|---|---|
| (4 days at about 25°C) | 22% |
| Physical properties after 14 days immersion in water at 158°F | |
| Tensile | 7100 |
| Elongation | 400 |

EXAMPLE IV

To a reactor was charged 100 parts of a polytetramethylene ether glycol/2,4-toluene diisocyanate prepolymer (obtained as Adiprene L–100 from the E I Du-Pont Co), 50 parts methyl ethyl ketone and 50 parts toluene.

An extender solution was prepared by mixing 2 parts 4,4'-diamino diphenyl sulfide with 10 parts methyl ethyl ketone. To the extender solution was mixed 50 parts of the diluted prepolymer. The mixture had a pot life of about 35 minutes. A film of the mixture was drawn on a polyethylene slab and allowed to cure at about 25°C for about 16 hours. The resultant translucent elastomer had the following properties shown in Table 5.

Table 5

| | |
|---|---|
| Tensile (psi) | 5100 |
| Elongation (%) | 520 |
| Thickness (inches) | 0.012 |
| Modulus (psi) 100% | 500 |
| 300% | 1100 |
| Hydrolysis resistance (14 days in water at 158°F) | |
| Tensile | 2300 |
| Elongation | 580 |
| Smear point | 360°F |
| Volume change in Larmol (4 days at 25°C) | 31.6% |

EXAMPLE V

A molten casting was prepared by mixing the prepolymer of Example III with 4,4'-diamino diphenyl disulfide according to the following recipe shown in Table 6.

Table 6

| Compound | Parts |
|---|---|
| Prepolymer (4.6% NCO) | 200 |
| Epon resin in MEK (80%) | 3 |
| 4,4'-diamino diphenyl sulfide | 20.8 |
| Polytetramethylene ether glycol | 10 |
| Santowhite powder | 0.3 |

The prepolymer was heated to about 200°F to about 220°F and the epon resin was then added with gentle stirring. The total mixture according to the recipe in Table 6 was then heated to about 210° to about 220°F.

The extender solution was added to the molten prepolymer, stirred well and poured into molds. The hot mixture had a pot life of about 4 minutes. The casting was then placed in an oven at about 180°F for 24 hours. The resulting elastomer was analyzed to have a Shore A hardness of 87.

While certain representative embodiments and details have been shown for the purpose of illustrating the invention, it will be apparent to those skilled in this art that various changes and modifications may be made therein without departing from the spirit or scope of the invention.

What is claimed is:

1. A cured polyurethane prepared by reacting 4,4'-diaminodiphenylsulfide with (A) a mixture of an organic polyisocyanate having an isocyanate functionality of 2 to 3 with a polymeric polyol having a hydroxyl functionality of 2 to 3 and a molecular weight in the range of about 500 to about 6000, where the ratio of isocyanato groups of said polyisocyanate to hydroxyl groups of said polymeric polyol is in the range of about 1.3/1 to about 5/1 or (B) the reaction product of said polyisocyanate and said polymeric polyol.

2. The cured polyurethane of claim 1 prepared by reacting 4,4'-diaminodiphenylsulfide at a temperature in the range of about 20°C to about 150°C with an isocyanate-terminated prepolymer prepared by the method which comprises reacting a polyisocyanate, having an isocyanate functionality of 2 to 3, selected from the group consisting of polyester polyols, polyether polyols and hydroxyl terminated unsaturated polymeric polyols, where the ratio of isocyanato groups to hydroxyl groups of the polyol is in the range of about 1.3/1 to about 5/1, where the ratio of amino groups of the 4,4'-diaminodiphenyl sulfide to excess isocyanato groups over said hydroxyl groups is in the range of about 0.5/1 to about 1.1/1, and where said hydroxyl terminated unsaturated polymeric polyol has a molecular weight of about 2000 to about 4000 and a corresponding hydroxyl number of about 50 to about 25 and is selected from unsaturated polymers of the type prepared by polymerizing a mixture of unsaturated monomers comprising about 70 to about 100 percent conjugated diene selected from 1,3-butadiene and isoprene and up to about 30 percent styrene.

3. The cured polyurethane of claim 2 where the 4,4'-diaminodiphenylsulfide is reacted at a temperature in the range of about 20°C to about 100°C with an isocyanate-terminated prepolymer prepared by reacting a polyisocyanate with a polymeric polyol having a molecular weight in the range of about 800 to about 5000, where the ratio of isocyanato groups to hydroxyl groups of the polyol is in the range of about 1.5/1 to about 3/1, and where the ratio of amino groups of the 4,4'-diaminodiphenyl sulfide to excess isocyanato groups over said hydroxyl groups is in the range of about 0.8/1 to about 1/1.

4. The cured polyurethane according to claim 2 where said polyisocyanate has an isocyanate functionality of about 2.3 to about 2.7.

5. The cured polyurethane according to claim 3 where the said polyisocyanate is selected from toluene diisocyanate, n-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis(cyclohexylisocyanate), 3,3'-dimethyl-4,4-diphenyl methane diisocyanate and 1,5-tetrahydronaphthalene diisocyanate.

6. The cured polyurethane according to claim 3 where said polyester polyols are the condensation products of low molecular weight polyols selected from ethylene glycol, propylene glycol, butylene glycol, pentylene glycol and decamethylene glycol with an organic dicarboxylic acid selected from succinic acid, glutaric acid, adipic acid, phthalic acid, terephthalic acid, isophthalic acid, suberic acid, sebacic acid, pimelic acid and azelaic acid.

7. The cured polyurethane according to claim 3 where said polyester polyols are caprolactone polyesters derived by reacting a caprolactone selected from ε-caprolactone, zeta caprolactone, and eta caprolactone with a glycol having 4 to 6 carbon atoms.

8. The cured polyurethane according to claim 3 where the polyether polyols are selected from those prepared by polymerizing or copolymerizing alkylene oxides selected from ethylene oxide, propylene oxide and butylene oxide and by polymerizing or copolymerizing low molecular weight glycols, and further by the reaction of at least one alkylene oxide selected from ethylene oxide, propylene oxide and butylene oxide with a polycarboxylic acid.

9. The cured polyurethane according to claim 8 where the polyether polyol is polytetramethylene ether glycol.

10. The cured polyurethane according to claim 3 which contains about 1 to about 15 weight percent of an epoxy resin, and at least sufficient amount of said resin to give an excess of epoxide groups relative to the total amount of amino groups of the monosulfide diamine curative over said excess isocyanato groups, where said epoxy resin is derived from epichlorhydrin and 2,2-bis(4-hydroxyphenyl) propane with an epoxide equivalency of about 150 to about 220.

* * * * *